2,980,503
Patented Apr. 18, 1961

2,980,503

METHOD OF PRODUCING CAESIUM CARBONATE AND CAESIUM SULPHATE FROM AQUEOUS NITRIC ACID SOLUTIONS OF FISSION PRODUCTS

Thomas Victor Healy, Chilton, Harwell, England, assignor to The United Kingdom Atomic Energy Authority, London, England No Drawing. Filed July 30, 1957, Ser. No. 675,014

Claims priority, application Great Britain July 30, 1956

12 Claims. (Cl. 23—63)

This invention relates to the recovery of radioactive caesium from the products resulting from the nuclear fission of elements of high atomic weight especially that of uranium, and in particular to methods for recovering radioactive caesium in a form suitable for use in radioactive sources for industrial or medical purposes, for example in teletherapy units.

The extraction of plutonium and uranium from nuclear fuel elements which have been used in a nuclear reactor gives rise to a substantial residue containing fission products. Caesium occurs in such residue to an extent which justifies its recovery for use as a source of radioactivity. The most suitable form in which the caesium may be used for these purposes is a chemically stable caesium salt which is not affected adversely over a long period by its radioactivity. In particular, pure caesium sulfate and pure caesium chloride have been found to be most suitable forms.

The residue from a process for extracting plutonium and uranium from nuclear fuel elements which have been used in a nuclear reactor frequently appears in the form of an aqueous nitric acid solution of nuclear fission products, corrosion products such as iron and nickel, and a small amount of residual uranium.

In the specification of United Kingdom Patent No. 736,429 a process has been described for the recovery of caesium from an aqueous nitric acid solution of nuclear fission products, which comprises treating the said solution with phosphotungstic acid and separating the precipitate of caesium phosphotungstate which is formed. In this precipitate, however, the caesium is to some extent contaminated with other radioactive fission products and with other impurities including corrosion products and uranium, so that its chemical and radiochemical purity is not high. In order to obtain the caesium in greater purity it has been necessary to redissolve the phosphotungstate in alkali or ammonia solution and reprecipitate it with acid. Finally, in order to obtain the caesium in the form of a suitable salt for use in radioactive sources, it is necessary to obtain a solution of caesium free from phosphate, tungstate and phosphotungstate ions. For this purpose, an ion-exchange process has been proposed, to replace the phosphotungstate ions by hydroxyl ions. Such a process, however, introduces difficulties due to the highly radioactive nature of the caesium solutions. Breakdown of organic ion-exchange material by the radiation leads to contamination of the caesium solution with organic matter which must be removed, for example, by treatment of the solution in a Castner-Kellner electrolytic cell. The purified solution, free from phosphotungstate ions, has then to be treated to convert the caesium to the required caesium salt, and this caesium salt recovered from solution by evaporation or precipitation.

It is an object of the present invention to provide an improved process for obtaining a purified solution containing caesium from caesium phosphotungstate, which solution is substantially free from phosphate, tungstate and phosphotungstate ions, and which process does not introduce further impurities into the solution. A further object of the present invention is to provide a process for converting caesium phosphotungstate into other caesium salts, particular caesium sulphate or caesium chloride, in a small number of steps.

According to the present invention, a process for producing a solution containing caesium from caesium phosphotungstate, said solution being substantially free from phosphate, tungstate and phosphotungstate ions, comprises the steps of adding to said caesium phosphotungstate a solution containing the hydroxide of an alkaline earth metal, said hydroxide being in amount in excess of the chemical equivalent of the phosphate and tungstate in said caesium phosphotungstate, whereby a solution is formed containing caesium hydroxide and excess alkaline earth metal hydroxide but substantially no phosphate, tungstate or phosphotungstate ions, and then precipitating said excess alkaline earth metal. An alkaline earth metal is defined as any of the metals calcium, strontium or barium. The preferred alkaline earth metal is barium and the solution added to the caesium phosphotungstate is preferably a saturated solution of barium hydroxide.

According to one particular aspect of the invention, caesium sulphate is produced by precipitating said excess alkaline earth metal as sulphate by adding sulphuric acid in slight excess to give a solution of pH of about 3 to 4, separating the slightly acid solution containing caesium sulphate from the sulphate precipitate, and recovering caesium sulphate from the separated solution.

According to another particular aspect of the invention, caesium sulphate or caesium chloride is produced by precipitating a major proportion of the said excess alkaline earth metal as carbonate by adding ammonium carbonate in excess and boiling the solution, evaporating the solution so formed to small bulk whereby the excess ammonia is driven off and the remainder of the alkaline earth metal is precipitated as carbonate, separating the remaining solution containing caesium from the carbonate precipitate, adding sulphuric or hydrochloric acid in slight excess to the separated solution, and recovering caesium sulphate or caesium chloride, respectively, from the slightly acid solution.

The solution containing the hydroxide of an alkaline earth metal may, in accordance with the invention, be added either directly to the caesium phosphotungstate precipitate obtained from an aqueous nitric acid solution of nuclear fission products by the method of United Kingdom Patent No. 736,429, or to the solution obtained by dissolving such a precipitate in ammonium hydroxide solution.

In order to improve the recovery of caesium, the solution formed on addition of the solution containing the hydroxide of an alkaline earth metal may be separated from the precipitate associated with it, said precipitate washed with further solution of the said hydroxide, and the washings added to the separated solution, before precipitation of the excess alkaline earth metal.

It has been found that addition of the alkaline earth metal hydroxide solution in excess to either a precipitate of caesium phosphotungstate or an ammoniacal solution thereof results in the formation of a solution containing the caesium and a precipitate containing the phosphate and tungstate of the alkaline earth metal. The solution contains no phosphate or phosphotungstate ions under these conditions, and only a very small amount of tungstate ions. If sufficient sulphuric acid is added to this solution to give a solution of pH about 3 to 4, the excess alkaline earth metal is precipitated quantitatively as sulphate, together with any tungstic acid formed by the action of sulphuric acid on tungstate ions present. The remaining solution contains substantially pure caesium sulphate. Alternatively, if excess ammonium carbonate is added to the solution obtained on adding the alkaline earth metal hydroxide solution and the solution boiled, then most of the alkaline earth metal is precipitated as carbonate. The excess ammonia is then driven off by evaporating to small bulk, at which stage the remainder of the alkaline earth metal is precipitated as carbonate together with tungstic acid formed by hydrolysis of any small amount of tungstate ions still present. By adding sulphuric or hydrochloric acid to the remaining solution, a solution is obtained of caesium sulphate or chloride, respectively. Substantially pure caesium sulphate or chloride may be obtained by evaporation of these solutions.

As has been hereinbefore stated the caesium phosphotungstate derived from a nitric acid solution of nuclear fission products contains impurities. These comprise (i) other fission products which impair the radiochemical purity of the caesium and may also impair the stability of radioactive caesium sources prepared therefrom, and (ii) corrosion products, such as iron and nickel, and also uranium and impurities therein such as aluminium and lead, which also impair the stability of radioactive caesium sources, as well as diluting the caesium and reducing the specific radioactivity of such sources. It has been found, however, that the precipitate of phosphate and tungstate, formed on addition of alkaline earth metal hydroxide by the method of the invention, scavenges out a large proportion of both types of these impurities. Rubidium, if present in the original phosphotungstate precipitate, remains in association with the caesium throughout the process, but is not a deleterious impurity since it is not radioactive and is chemically very similar to caesium; it only acts as a diluent for the radioactive caesium and so may be tolerated.

The nature of the invention will be more really understood if reference is made to the following examples in which particular embodiments of the invention are described:

Example 1

Pure caesium phosphotungstate was precipitated from an aqueous nitric acid solution containing caesium nitrate by addition of phosphotungstic acid. After washing the precipitate with dilute nitric acid, it was digested with an excess of cold saturated barium hydroxide solution. It was found that over 97% of the caesium was brought into solution, and that a precipitate was left consisting of barium phosphate and barium tungstate. The solution, now containing caesium hydroxide and the excess barium hydroxide, was filtered off, and the precipitate was washed with dilute barium hydroxide solution, the washings being added to the filtered solution. This added a further 2% of the caesium to that already in solution making a total recovery of over 99% of the caesium.

To the separated solution was now added a slight excess of dilute sulphuric acid solution, to give a final pH between 3 and 4. This precipitated the barium quantitatively as barium sulphate, and left a slightly acid solution of caesium sulphate. After filtration, this solution was evaporated to dryness to recover pure caesium sulphate.

Since barium tungstate is slightly soluble in water and dilute barium hydroxide, a small amount of tungstic acid, liberated on addition of sulphuric acid, was found to be precipitated with the barium sulphate.

Less than 1% of the caesium was carried down with the barium sulphate precipitate, so that an overall recovery of more than 98% of the caesium was obtained.

Example 2

Caesium phosphotungstate obtained from a simulated solution of mixed nuclear fission products in nitric acid was treated in exactly the same way as in Example 1. This simulated solution of mixed nuclear fission products was a synthetic solution having a composition similar to that of the actual fission product solution detailed in Example 6, below, but was not radioactive except for small amounts of radioactive tracers for some elements.

More than 99% of the caesium was extracted by the barium hydroxide solution, including washings, and more than 99% of this caesium remained in solution after precipitation of the barium with sulphuric acid. Thus an overall recovery of more than 98% of the caesium was obtained.

The caesium sulphate recovered had, apart from rubidium, a very high degree of chemical purity, impurities having been scavenged out by the barium tungstate and barium phosphate precipitate. The radiochemical purity of the caesium sulphate was greater than 99%, as ascertained by radioactive tracers.

Example 3

Caesium phosphotungstate obtained from a simulated solution of mixed fission products in nitric acid, as in Example 2, was washed with dilute nitric acid, and then digested with an excess of cold saturated barium hydroxide solution. The solution was then neutralised with dilute sulphuric acid solution and the neutral solution decanted. Evaporation of the solution to dryness yielded a caesium sulphate sufficiently free from impurities and having sufficient radiochemical purity to be good enough for industrial use as a radio-active source.

Example 4

Caesium separated as the phosphotungstate from an aqueous nitric acid solution of uranium fission products was dissolved in aqueous 2% ammonia to give 55 cc. of a solution containing 3.5 milligrams per cc. of caesium. The solution was treated with 24 cc. of an aqueous solution of barium hydroxide containing 0.125 milligram of $Ba(OH)_2 \cdot 8H_2O$ per cc. After filtration and washing of the precipitate, the filtrate and washings were combined, evaporated to 75 cc. and neutralized with N sulphuric acid using bromophenol blue as indicator (pH 3 to 4) to give a solution of caesium sulphate. The solution was evaporated to dryness to give pure caesium sulphate.

The amount of phosphotungstic acid present in the final solution was approximately 96 micrograms per cc. The overall recovery of radioactive caesium, based on that originally present in the aqueous nitric acid solution was 80 percent.

Example 5

On repeating the method described in Example 4, but employing twice the amount of barium hydroxide solution, the overall recovery of radioactive caesium was 88 percent of the amount originally present in the aqueous nitric acid solution.

Example 6

A solution containing 0.5 gm. of pure phosphotungstic acid ($H_3PO_4 \cdot 12WO_3 \cdot 24H_2O$) was added in 1 ml. of water to 1 litre of a concentrated solution of mixed fission products derived from nuclear fission of uranium, and having the following approximate composition:

| | Gm./litre |
|---|---|
| Fission products: | |
| Rubidium | 0.004 |
| Caesium | 0.03 |
| Strontium | 0.01 |
| Barium | 0.01 |
| Cerium | 0.02 |
| Rare earths | 0.06 |
| Zirconium | 0.03 |
| Molybdenum | 0.02 |
| Ruthenium | 0.01 |
| Other impurities: | |
| Uranium | 1.0 |
| Iron | 0.7 |
| Nickel | 0.02 |
| Chromium | 0.01 |
| Aluminium | 0.3 |
| Lead | 0.01 |

The amount of phosphotungstic acid added was such as to provide approximately ⅔ mole of phosphotungstic acid to each atom of caesium, which is twice the amount necessary to precipitate the whole of the caesium.

The precipitate obtained was washed twice with 1 litre of water and then dissolved in 2 litres of 4 N ammonium hydroxide solution. To this ammoniacal solution was added 800 ml. of saturated aqueous barium hydroxide solution. The mother liquor was separated and the barium precipitate was extracted with a further 800 ml. of saturated barium hydroxide solution and then washed twice with 1 litre of water. The mother liquors from the barium hydroxide extractions and the washes were combined and were found to contain greater than 99% of the caesium originally contained in the fission product solution.

It was found that the ammoniacal solution of caesium phosphotungstate contained only about 1%, and the combined barium hydroxide extracts contained less than 0.3% of the original fission product activity other than that due to the caesium itself. This showed that a 100-fold decontamination of the caesium from other radioactive fission products took place during the precipitation by phosphotungstic acid, and a further at least 3-fold decontamination took place during the barium hydroxide addition. The barium hydroxide addition was also found to effect a substantial decontamination of the caesium from such corrosion products and other impurities as were not completely removed during the phosphotungstate separation stage.

To the combined barium hydroxide extracts and washes was added ammonium carbonate in excess and the solution boiled, to precipitate barium carbonate, and the solution was then evaporated to small bulk to drive off the ammonia and precipitate the remaining barium carbonate and a small amount of tungstic acid. The solution containing caesium carbonate was separated from the precipitate and neutralised with sulphuric acid to a pH between 3 and 4. On evaporation to dryness, substantially pure caesium sulphate was obtained.

Example 7

The process of Example 6 was carried out exactly as before, except that the separated solution containing caesium carbonate was neutralised with hydrochloric acid and, on evaporation, substantially pure caesium chloride was obtained.

Whereas the above examples quote the use of barium hydroxide only, the use of the other alkaline earth metal hydroxides, namely calcium hydroxide and strontium hydroxide, is also within the scope of the invention, since each has the power to bring the caesium into solution and form an insoluble precipitate of the phosphate and tungstate of the alkaline earth metal and each also forms an insoluble precipitate on addition of sulphuric acid or ammonium carbonate. The use of barium hydroxide is preferred on account of its greater solubility and the somewhat greater insolubility of barium phosphate, tungstate, sulphate and carbonate, compared with phosphates, tungstates, sulphates and carbonates of calcium and strontium.

Caesium chloride or caesium sulphate obtained by a process according to the present invention may be incorporated into a radioactive source, suitable for use in a teletherapy unit, by enclosing it as a dry powder in a capsule, or by melting and casting it into a capsule.

I claim:

1. A method of recovering radioactive caesium in a highly purified condition from an aqueous nitric acid solution of nuclear fission products comprising the steps of precipitating said radioactive caesium as phosphotungstate from said solution by the addition thereto of phosphotungstic acid, separating the precipitate of said phosphotungstate from said solution, adding to said precipitate a solution of an alkaline earth metal hydroxide, said alkaline earth metal being in excess of the chemical equivalent of the phosphate and tungstate in said phosphotungstate so that a solution containing said radioactive caesium as hydroxide and a precipitate of the phosphate and tungstate of said alkaline earth metal are formed, precipitating the excess of said alkaline earth metal as sulphate by the addition of sulphuric acid to give a solution of pH 3 to 4, and separating the solution now containing said radioactive caesium as sulphate from the precipitate of the sulphate, phosphate and tungstate of said alkaline earth metal.

2. A method according to claim 1, wherein said alkaline earth metal is barium.

3. A method of recovering radioactive caesium in a highly purified condition from an aqueous nitric acid solution of nuclear fission products comprising the steps of precipitating said radioactive caesium as phosphotungstate from said solution by the addition thereto of phosphotungstic acid, separating the precipitate of said phosphotungstate from said solution, adding to said precipitate a solution of an alkaline earth metal hydroxide, said alkaline earth metal being in excess of the chemical equivalent of the phosphate and tungstate in said phosphotungstate so that a solution containing said radioactive caesium as hydroxide and a precipitate of the phosphate and tungstate of said alkaline earth metal are formed, separating the solution containing said radioactive caesium as hydroxide from the precipitate of the phosphate and tungstate of said alkaline earth metal, precipitating the excess of said alkaline earth metal as sulphate by the addition of sulphuric acid to give a solution of pH 3 to 4, and separating the solution now containing said radioactive caesium as sulphate from the precipitate of the sulphate of said alkaline earth metal.

4. A method according to claim 3, wherein said alkaline earth metal is barium.

5. A method of recovering radioactive caesium in a highly purified condition from an aqueous nitric acid solution of nuclear fission products comprising the steps of precipitating said radioactive caesium as phosphotungstate from said solution by the addition thereto of phosphotungstic acid, separating the precipitate of said phosphotungstate from said solution, adding to said precipitate a solution of an alkaline earth metal hydroxide, said alkaline earth metal being in excess of the chemical equivalent of the phosphate and tungstate in said phosphotungstate so that a solution containing said radioactive caesium as hydroxide and a precipitate of the phosphate and tungstate of said alkaline earth metal are formed, precipitating the excess of said alkaline earth metal as carbonate by the addition of ammonium carbonate in excess and boiling the solution, evaporating the solution now containing said radioactive caesium as carbonate to small bulk whereby ammonia is driven off, and separating the solution containing said radioactive caesium as carbonate from the precipitate of the carbonate, phosphate and tungstate of said alkaline earth metal.

6. A method according to claim 5, wherein said alkaline earth metal is barium.

7. A method of recovering caesium in a highly purified condition from an aqueous nitric acid solution of nuclear fission products comprising the steps of precipitating said radioactive caesium as phosphotungstate from said solution by the addition thereto of phosphotungstic acid, separating the precipitate of said phosphotungstate from said solution, adding to said precipitate a solution of an alkaline earth metal hydroxide, said alkaline earth metal being in excess of the chemical equivalent of the phosphate and tungstate in said phosphotungstate so that a solution containing said radioactive caesium as hydroxide and a precipitate of the phosphate and tungstate of said alkaline earth metal are formed, separating the solution containing said radioactive caesium as hydroxide from the precipitate of the phosphate and tungstate of said alkaline earth metal, precipitating the excess of said alkaline earth metal as carbonate by the addition of ammonium carbonate in excess and boiling the solution, evaporating the solution now containing said radioactive caesium as carbonate to small bulk whereby ammonia is driven off, and separating the solution containing said radioactive caesium as carbonate from the precipitate of the carbonate of said alkaline earth metal.

8. A method according to claim 7, wherein said alkaline earth metal is barium.

9. The method according to claim 1 wherein the phosphotungstate precipitate is first dissolved in an aqueous solution of ammonia to which the solution of an alkaline earth metal hydroxide is then added, and the caesium hydroxide solution is evaporated to small bulk so as to drive off ammonia before the excess of said alkaline earth metal is precipitated as sulphate.

10. The method according to claim 9 wherein the solution containing said radioactive caesium as hydroxide is separated from the precipitate of the phosphate and tungstate of said alkaline earth metal, the solution of caesium hydroxide is evaporated to small bulk so as to drive off ammonia, the excess of said alkaline earth metal is precipitated as sulphate by the addition of sulphuric acid to give a solution of pH 3 to 4, and the solution now containing said radioactive caesium as sulphate is separated from the precipitate of the sulphate of said alkaline earth metal.

11. The method according to claim 1 wherein the phosphotungstate precipitate is first dissolved in an aqueous solution of ammonia to which the solution of an alkaline earth metal hydroxide is then added, the excess of said alkaline earth metal is precipitated as carbonate by the addition of ammonium carbonate in excess to and boiling of the solution, the solution now containing said radioactive caesium as carbonate is evaporated to small bulk so as to drive off ammonia, and the solution containing said radioactive caesium as carbonate is separated from the precipitate of the carbonate, phosphate, and tungstate of said alkaline earth metal.

12. The method according to claim 11 wherein the solution containing said radioactive caesium as hydroxide is separated from the precipitate of the phosphate and tungstate of said alkaline earth metal, the excess of said alkaline earth metal is precipitated as carbonate by the addition of ammonium carbonate in excess to and boiling of the solution, the solution now containing said radioactive caesium as carbonate is evaporated to small bulk so as to drive off ammonia, and the solution containing said radioactive caesium as carbonate is separated from the precipitate of the carbonate of said alkaline earth metal.

References Cited in the file of this patent
FOREIGN PATENTS 736,429     Great Britain   _____ Sept. 7, 1955

OTHER REFERENCES

Mellor: "A Comprehensive Treatise on Inorganic and Theoretical Chemistry," Longmans, Green and Co., N.Y., vol. 8, 1928, page 966; vol. 2, 1922, pages 528, 534, 660 and 664, vol. 3, 1923, pages 763, 777–780, 818–19 and 824–825, vol. 11, 1931, pages 787 and 865.